(12) United States Patent
Bowles et al.

(10) Patent No.: US 6,264,406 B1
(45) Date of Patent: Jul. 24, 2001

(54) SUPPORT FOR MOUNTING A TOOL ON A PIPE

(75) Inventors: Richard R. Bowles, Solon; Robert M. Baracskai, North Ridge, both of OH (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/406,988

(22) Filed: Sep. 28, 1999

(51) Int. Cl.$^7$ .................................................. B23B 45/14
(52) U.S. Cl. ................... 408/92; 269/131; 81/65.2; 408/112; 408/712
(58) Field of Search ............... 408/92, 111, 112, 408/712; 30/100; 269/130–132; 81/65.2, 65.4

(56) References Cited

U.S. PATENT DOCUMENTS

| | | | |
|---|---|---|---|
| 631,922 | * 8/1899 | Baumgardner | 408/92 |
| 641,922 | * 1/1900 | Baumgardner | 408/92 |
| 827,079 | 7/1906 | Clark . | |
| 1,103,243 | 7/1914 | Amborn . | |
| 1,130,395 | 3/1915 | Gilmour . | |
| 1,173,496 | 2/1916 | Elzay . | |
| 1,480,972 | * 1/1924 | Wallace | 81/65.4 |
| 1,590,643 | * 6/1926 | Neuwelt | 408/112 |
| 1,935,902 | 11/1933 | Brant . | |
| 2,281,366 | 4/1942 | Metcalf . | |
| 2,379,014 | 6/1945 | Lowe . | |
| 2,585,343 | 2/1952 | Newlon . | |
| 2,994,235 | * 8/1961 | Rise | 408/112 |
| 3,669,439 | * 6/1972 | Sanchez | 269/130 |
| 3,741,670 | * 6/1973 | Wood | 408/92 |
| 4,726,575 | 2/1988 | Dearman . | |
| 4,936,720 | * 6/1990 | Dolatowski et al. | 408/92 |
| 5,051,044 | * 9/1991 | Allen | 408/92 |
| 6,050,753 | * 4/2000 | Turner | 408/92 |

FOREIGN PATENT DOCUMENTS

| | | | |
|---|---|---|---|
| 121647 | * 7/1946 | (AU) | 408/112 |
| 98/16353 | * 4/1998 | (WO) . | |

OTHER PUBLICATIONS

Ridge Tool Catalog No. RT–199, dated Jan. 1999, 3 pages.

* cited by examiner

Primary Examiner—Steven C. Bishop
(74) Attorney, Agent, or Firm—Vickers, Daniels & Young

(57) ABSTRACT

A tool support for mounting a working tool on a pipe comprises a base having inverted V-shaped saddle portions engaging the pipe and a clamping chain extending between opposite sides of the base for clamping the base on a pipe. A first end of the chain is mounted on one side of the base by a biasing spring arrangement which provides for limited displacement of the end in the direction of tensioning of the chain, and the free end of the chain is adapted to be releasably interengaged with an adjusting mechanism on the opposite side of the base and by which the chain is tensioned to clamp the base against a pipe. A pipe drilling tool is removably mounted on the base and includes a handle by which the tool can be carried and supported during mounting on and dismounting from the base and by which the base and tool can be carried as a unit.

62 Claims, 6 Drawing Sheets

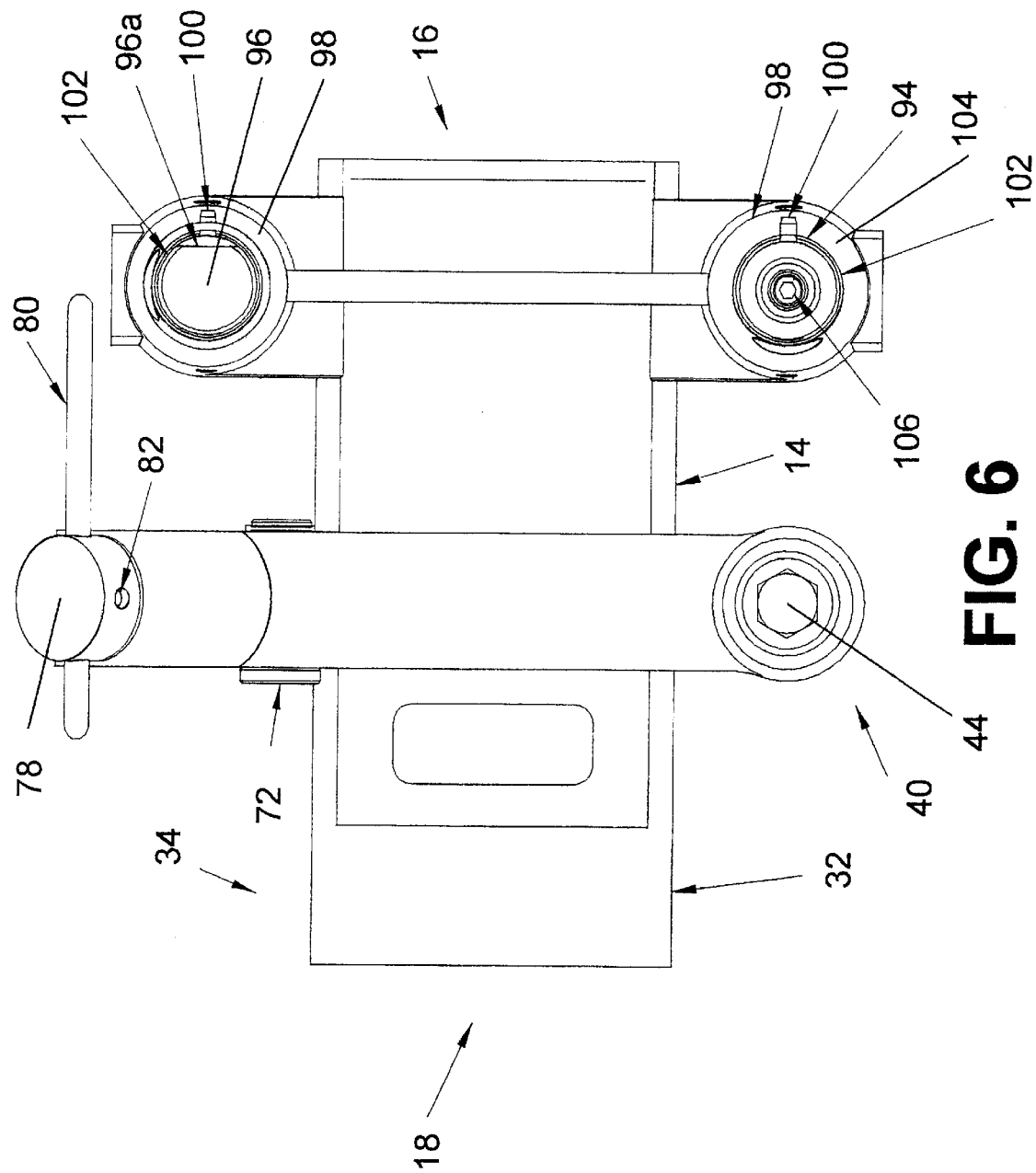

SUPPORT FOR MOUNTING A TOOL ON A PIPE

BACKGROUND OF THE INVENTION

This invention relates to the art of tools for performing work on a pipe and, more particularly, to a tool support for mounting a working tool on a pipe.

The present invention finds particular utility in connection with the mounting of a hole cutting tool on a pipe for drilling or cutting a hole therein and, accordingly, will be disclosed and discussed in detail in connection with such a tool. At the same time, it will be appreciated that the invention is applicable to the mounting of tools other than hole saws on a pipe upon which work is to be performed.

It is of course well known to provide a support for mounting a working tool such as a hole saw, drill or the like on a pipe through the use of a chain-type clamping arrangement in which a chain extends about the pipe between opposite ends of the support and is adjustable to releasably clamp the support on the pipe. Such supports heretofore available are shown, for example, in U.S. Pat. No. 2,281,366 to Metcalf and U.S. Pat. No. 2,585,343 to Newlon and are used in connection with a hole cutting tool available from the Ridge Tool Company of Elyria, Ohio under the latter's product designation Model HC-450. In these clamping arrangements, one end of the chain is anchored to an adjusting screw component and the other or free end of the chain is adapted to be adjustably interengaged with a holding component to allow the support to be mounted on pipes having different diameters. When the free end of the chain is interengaged with the holding component, the screw mechanism is rotated to tighten the chain about the pipe and thus clampingly engage the support thereon.

A major disadvantage of clamping arrangements of the foregoing character resides in the fact that it is difficult for a single worker to position the support and tool on a pipe and interengage the free end of the chain with the support to establish a preliminary mounted condition in which the operator can rotate the adjusting screw mechanism to tighten the chain and complete the mounting. In this respect, the operator must rest the support and tool on the pipe and stabilize the support and tool with one hand while using the other hand to move the free end of the chain under the pipe to the opposite side of the support and achieve interengagement of the free end of the chain with the holding component. If the pipe is of large diameter and/or at an elevation which requires the operator to stoop down or reach upwardly to manipulate the support, tool and chain, the difficulty of stabilizing the assembly with one hand and moving the chain with the other is optimized. In any event, engaging the free end of the chain with the holding component often must be achieved by "feel" as opposed to being able to observe relative displacement between the chain and holding component.

Another disadvantage with regard to such clamping chain arrangements is that the initial interengagement of the free end of the chain with the holding component results in the chain being loose to the extent that the operator must continue to stabilize the assembly with one hand until the chain is tightened through operation of the adjusting screw. In this respect, the holding component generally engages between adjacent chain rolls or roll pins extending from axially opposite sides of a link and the space between adjacent rolls or pins in the direction of the length of the chain is such that one roll or set of pins will not reach the holding component and the next adjacent ones that will result in the chain sagging away from engagement with the pipe. Accordingly, until the operator takes the slack out of the chain by rotating the adjusting screw, he or she must continue to stabilize the support and tool against displacement circumferentially of the pipe. Such support and tool assemblies are quite heavy and the difficulty with respect to stabilizing the assembly while rotating the adjusting screw increases as the diameter of the pipe decreases. Accordingly, it will be appreciated that considerable effort is required on the part of an operator to stabilize the support and tool when the assembly weighs more than 40 pounds and the diameter of the pipe can be as small as 1¼ inch as is possible in connection with use of the aforementioned Ridge Tool hole cutting tool.

SUMMARY OF THE INVENTION

In accordance with the present invention, a tool support for mounting a working tool on a pipe is provided which minimizes or overcomes the foregoing and other disadvantages of such supports heretofore available. More particularly in accordance with the present invention, a tool support having a chain-type clamping arrangement for mounting the support on a pipe minimizes the stabilizing effort required on the part of an operator in connection with displacing the free end of the chain into engagement with the holding component prior to operation of the adjusting screw to tighten the chain about the pipe. Moreover, the clamping arrangement in accordance with the present invention provides for the free end of the chain and the holding component to be visible to the operator, thus to optimize the ease with which the interengagement can be achieved. More particularly, these advantages are achieved by anchoring one end of the chain to the side of the support opposite the adjusting screw assembly and providing the holding component on the latter assembly, whereby an operator can reach beneath the pipe, pull the free end of the chain toward the adjusting mechanism and engage the chain with the holding component thereon and then rotate the adjusting mechanism to tighten the chain, all of which requires less effort on the part of the operator than that required in connection with the clamping arrangements heretofore available.

In accordance with another aspect of the invention, the end of the chain which is anchored to the support is interengaged therewith through an arrangement for biasing the chain against displacement in the direction of tensioning of the chain when operating the adjusting components to tighten the chain about a pipe. Accordingly, when the free end of the chain is moved into interengagement with the holding component, the biasing arrangement provides for such interengagement to result in the chain engaging with the pipe as opposed to sagging relative thereto following the initial mounting operation. Accordingly, the stabilizing effort on the part of the operator is minimized in connection with subsequent displacement of the adjusting mechanism to tightly clamp the support on the pipe.

In accordance with yet another aspect of the invention, an improved chain mountable support and pipe working tool arrangement is provided in which the tool is interengaged with the support by a release arrangement which advantageously enables the tool and support to be carried as a unit to a working site and quickly separated if desired to facilitate mounting of the support on a pipe independent of the tool, and then accommodates quick mounting of the tool on the support for use. The release arrangement advantageously optimizes the options available to an operator in connection with mounting the support and tool assembly on a pipe and in this respect, for example, allows the operator to separate the tool from the support and mount the latter on a pipe with minimum effort being required to stabilize the support relative to the pipe as a result of eliminating the weight and physical bulk of the pipe working tool. Further in accordance with this aspect of the invention, the tool is provided with a carrying handle structurally associated therewith in a manner whereby the tool and support can be carried as a unit in which the location of the handle and the weight distribution relative thereto optimize the ease with which the unit can be lifted and carried and the comfort of an operator in doing so. Moreover, the handle likewise facilitates the ease of lifting and maneuvering the tool during mounting thereof on the support.

It is accordingly an outstanding object of the present invention to provide an improved tool support and clamping chain arrangement for mounting the support or the support and a working tool on a pipe.

Another object is the provision of a tool support of the foregoing character which minimizes the effort required by an operator to stabilize the support, either alone or with a tool mounted thereon, during mounting of the support on a pipe.

A further object is the provision of a tool support of the foregoing character in which the holding component for the free end of the clamping chain is associated with the chain tightening component by which the operator secures the support to a pipe.

Still another object is the provision of a tool support of the foregoing character in which the interengagement of the free end of the chain with the holding component therefor during the initial mounting of the support on a pipe creates a biased engagement of the chain with the pipe to minimize the effort required by the operator to stabilize the support, or the support with a tool thereon, during completion of the mounting operation.

Yet another object is the provision of an improved support and working tool arrangement in which the support and working tool are selectively, releasably interengaged to facilitate the separation thereof and mounting of the support on the pipe prior to mounting the tool thereon, thus to optimize the ease with which an operator can mount the support on a pipe.

Still a further object is a provision of a tool support and tool unit of the foregoing character in which the releasing arrangement precludes unintentional separation of the tool from the support, and wherein the tool is provided with a handle positioned thereon so as to optimize the ease of lifting and carrying the unit and an operator's comfort in doing so.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawing in which.

DESCRIPTION OF A PREFERRED EMBODIMENT

Figure 1:
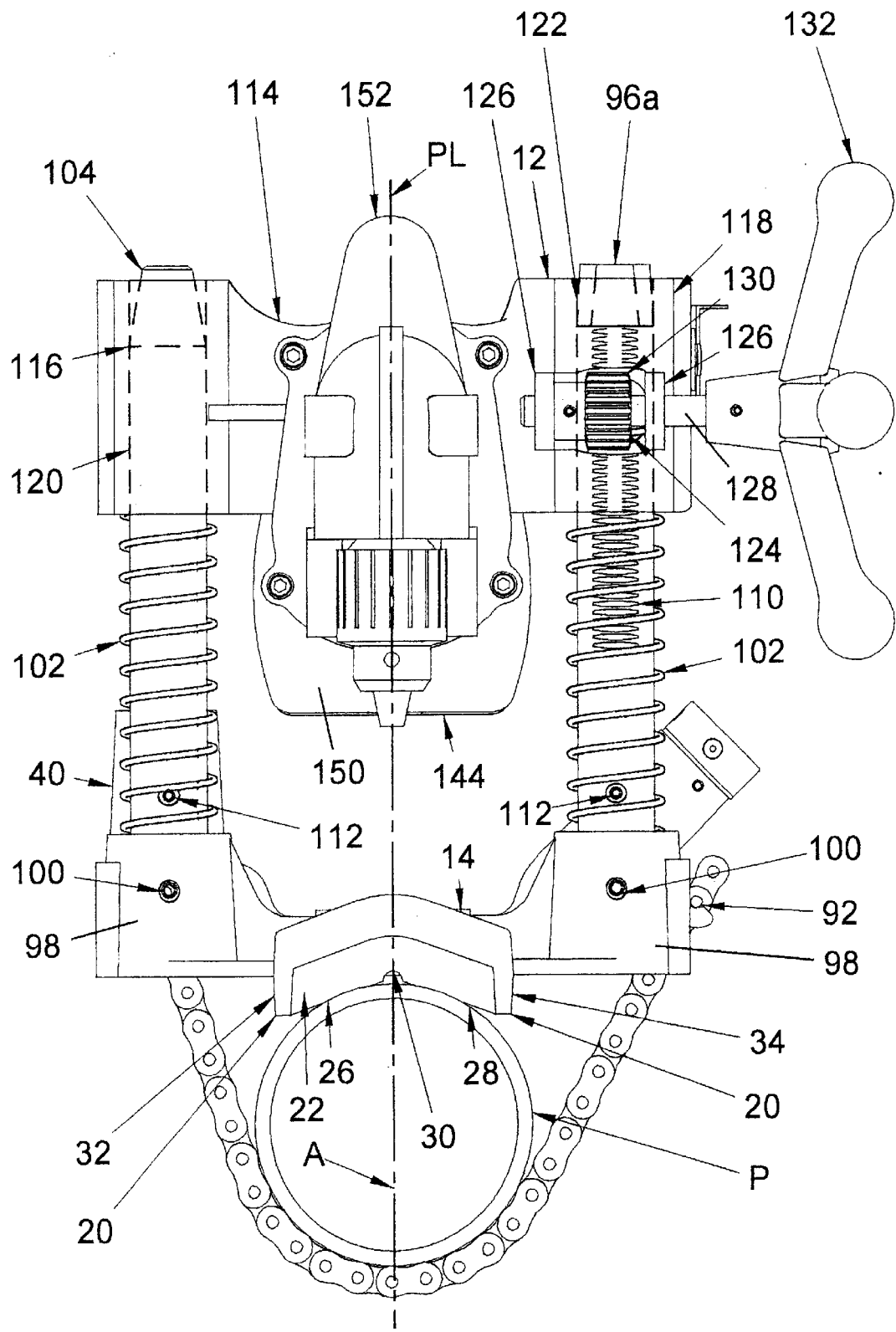
FIG. 1 is a front elevation view of a tool support and tool mounted on a pipe.

Referring now in greater detail to the drawings, wherein the showings are for the purpose of illustrating a preferred embodiment of the invention only and not for the purpose of limiting the invention, a tool support 10 is shown mounted on a pipe P having an axis A and supporting a tool 12 which, in the disclosed embodiment, is operable to drill or saw a hole in a pipe. Support 10 comprises an elongate base portion 14 having front and rear ends 16 and 18, respectively. A pair of legs 20 extend downwardly at front end 16 for the purpose set forth hereinafter, and inverted V-shaped saddle portions 22 and 24 are provided on the underside of base 14 respectively at a location intermediate the opposite ends and at rear end 18 thereof. Each of the saddle portions has a pair of planar surfaces 26 and 28 at an angle to one another and engaging the outer surface of pipe P at circumferentially spaced apart locations thereon to align the support with pipe axis A. Surfaces 26 and 28 have inner ends separated by an axially extending notch 30 at the vertex of the V defined by surfaces 26 and 28, and base 14 has first and second sides 32 and 34, respectively, on laterally opposite sides of a vertical plane PL bisecting the vertex of the saddle portions. Legs 20 do not engage pipe P when base 14 is mounted thereon, but serve to prevent forward tipping of the support and tool 12 thereon when resting on the ground or other underlying surface.

Figure 2:
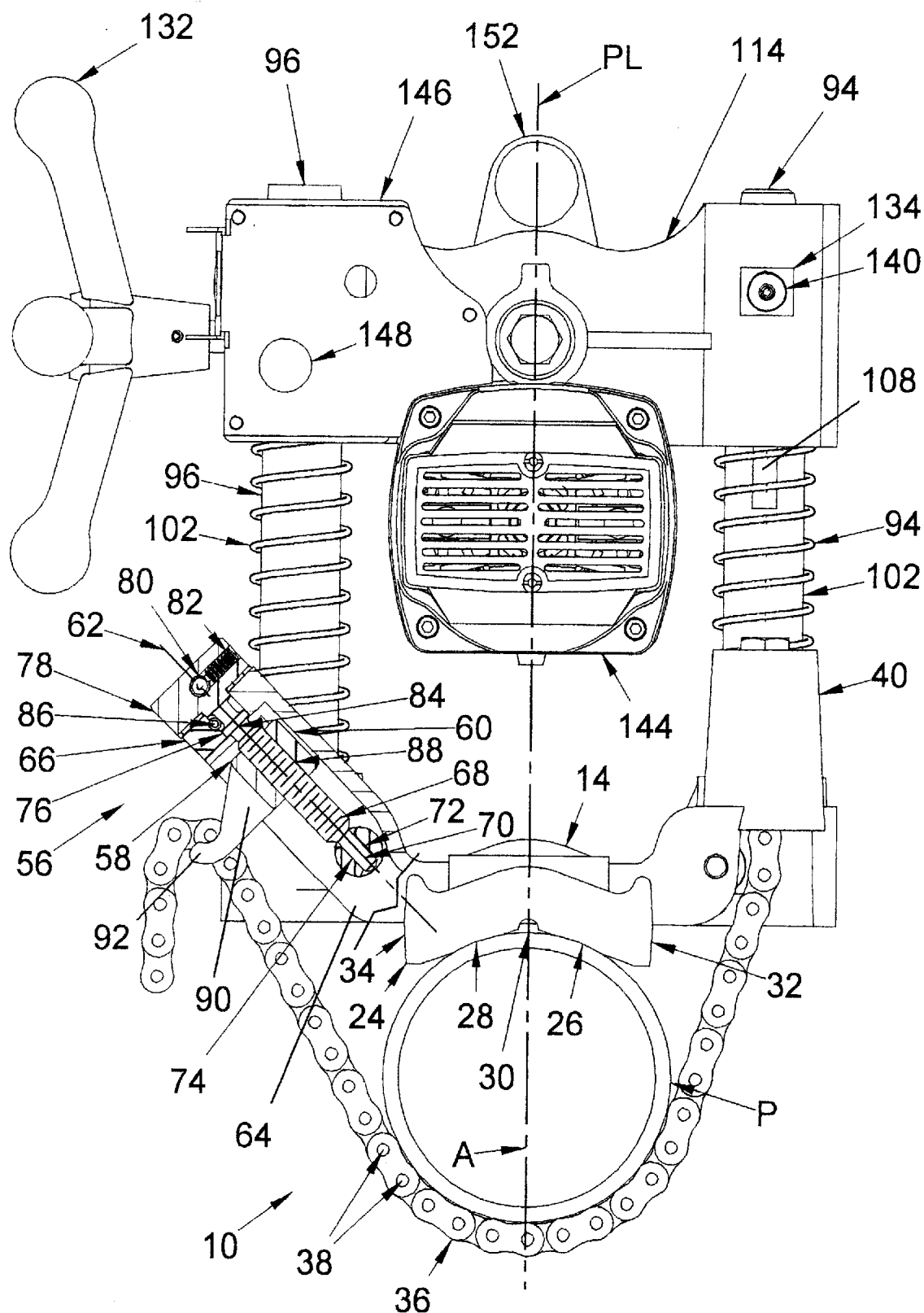
FIG. 2 is a rear elevation view of the tool support and tool shown in FIG. 1.
Figure 3:
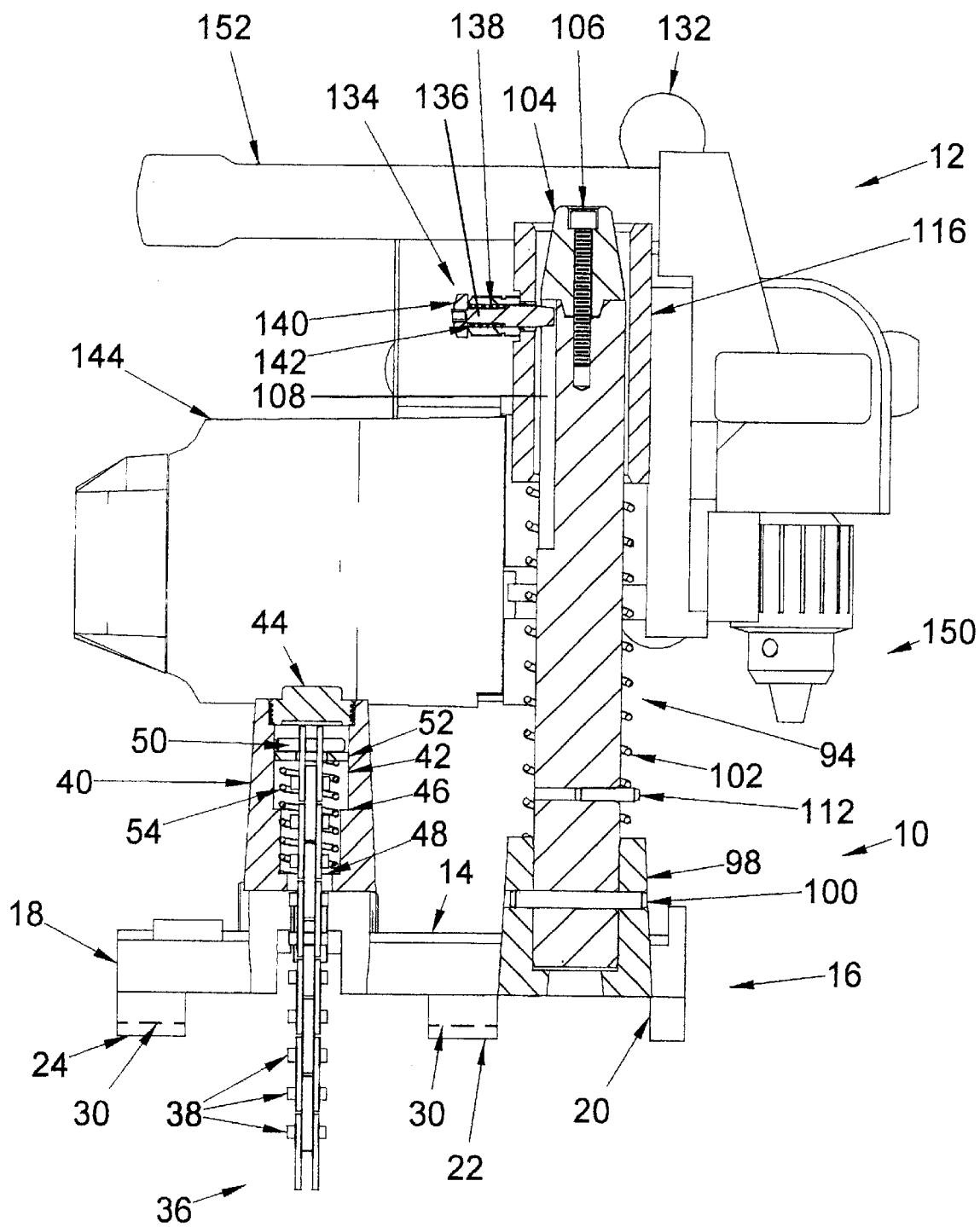
FIG. 3 is a side elevation view, partially in section, of the tool support and tool looking in the direction from right to left in FIG. 2.

Support 10 further includes a clamping arrangement 35 comprising a clamping member, a mounting assembly for one end thereof and an adjusting mechanism to tensioning the chain relative to the anchoring assembly. In the preferred embodiment, the clamping member is a chain 36 comprising a plurality of inner and outer link components, not designated numerically, interconnected by link pins 38 which, in the embodiment illustrated, extend laterally outwardly from the opposite sides of the outer links for the purpose set forth hereinafter. A first end of the clamping chain is mounted adjacent side 32 of the base in a tubular mounting column 40 positioned laterally outwardly of base 14 and, preferably and for the purpose set forth hereinafter, the first end of the chain is mounted for limited displacement in the direction toward the opposite end of the chain and against the return force of a biasing spring. More particularly in this respect, as best seen in FIGS. 2 and 3 of the drawing, column 40 includes a passage 42 therethrough having an axis, not designated numerically, generally parallel to plane PL and which passage and the underlying portion of base 14 are open to receive the first end of the clamping chain to extend from passage 42. Passage 42 has an upper end through which chain 36 is introduced, and the upper end is preferably closed by a removable plug 44 to preclude the ingress of dirt and other foreign matter into the passage and to capture the first end of chain 36 therein. Passage 42 is radially inwardly stepped between the outer and inner ends thereof to provide an intermediate shoulder 46 and a lower shoulder 48 for the purposes set forth hereinafter. The clamping chain has a terminal end in column 40 which includes a pin 50 extending transverse to the axis of the passage and through link components at the terminal end. A stop collar 52 extends about the terminal end of the chain beneath pin 50, and a biasing spring 54 extends about the portion of the chain in passage 42 between collar 52 and shoulder 48. Spring 54 has a relaxed position, as shown in FIG. 3 in which the biasing spring positions the terminal end of the chain adjacent the upper end of passage 42. In the manner and for the purpose set forth hereinafter, the terminal end of the chain is adapted to be displaced downwardly in passage 40 against the bias of spring 54 during mounting of the support on a pipe, and such downward movement is limited by engagement of collar 52 with intermediate shoulder 46 in the passage.

Figure 4:
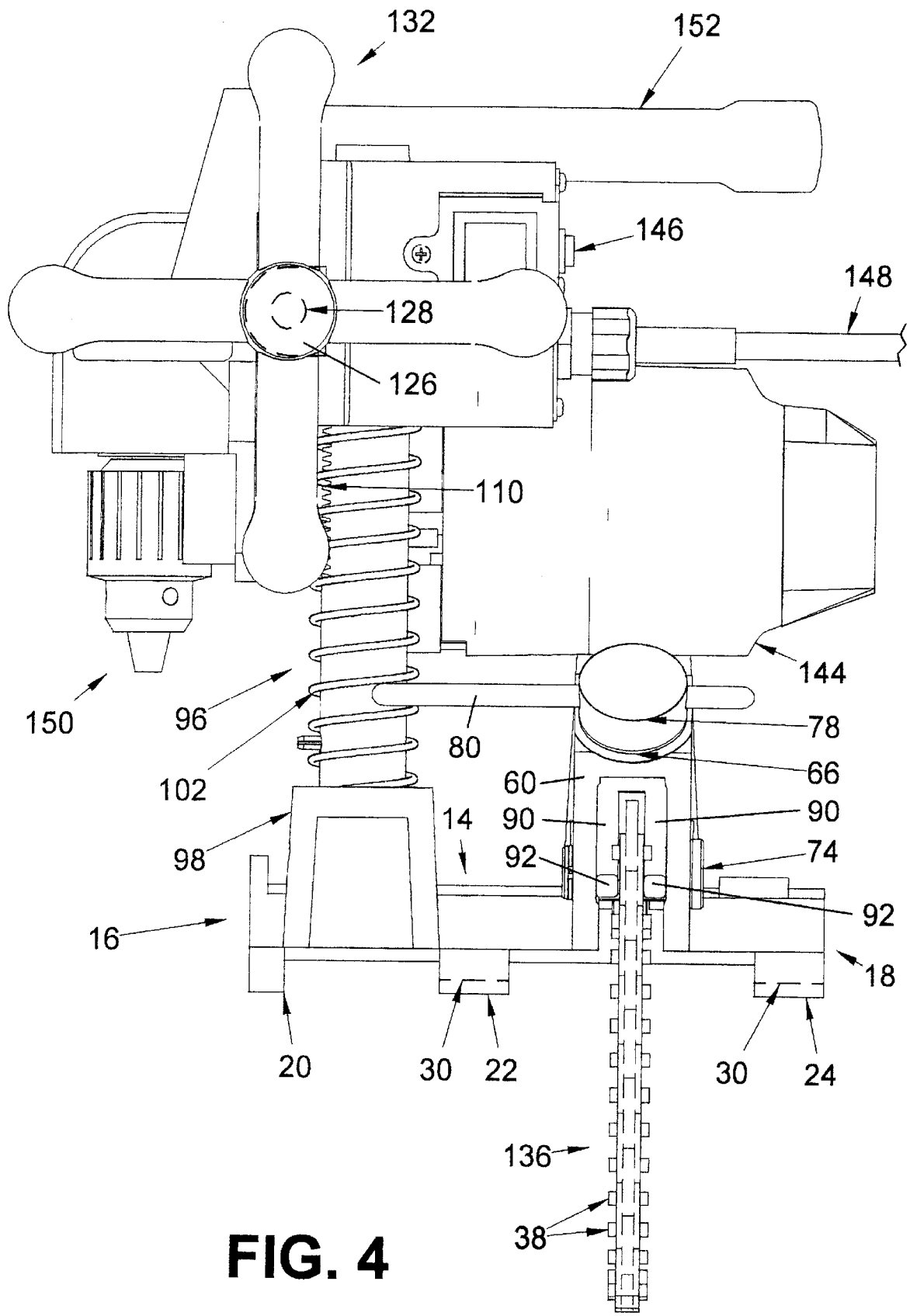
FIG. 4 is a side elevation view of the tool support and tool looking in the direction from left to right in FIG. 2.

As best seen in FIGS. 2 and 4 of the drawing, a clamping member adjusting mechanism 56 extends laterally outwardly of side 34 of base 14 so as to incline downwardly and inwardly at an angle relative to plane PL. Adjusting mechanism 56 includes a holding component 58 which, as set forth more fully hereinafter, interengages with the free or second end of clamping member 36 to clampingly mount base 14 and thus support 10 on pipe P. The adjusting mechanism includes an inverted, generally U-shaped housing portion 60 having an axis 62 and axially inner and outer ends 64 and 66, respectively, outer end 66 being defined by an end wall transverse to axis 62. An adjusting screw 68 extends through the housing coaxial with axis 62 and has an inner end 70 rotatably supported in an opening 72 provided therefor in a support pin 74 extending through inner end 64 of the housing transverse to axis 62. The outer end of the adjusting screw extends through an opening 76 provided therefor in the outer end wall of the housing and thence into an opening provided therefor in an end cap 78 by which the adjusting screw is rotatable by means of a handle 80. Handle 80 extends through the end cap and the outermost end of the adjusting screw and is held in place with respect thereto by means of a set screw 82 in the end cap. The portion of the adjusting screw extending through the outer end wall of the housing is provided with a circumferential recess 84 which receives a retaining pin 86 provided in the end wall to preclude axial displacement of the adjusting screw relative to the housing and pin 74. The portion of the adjusting screw between the outer end wall and pin 74 is externally threaded, and holding component 58 is provided with a carriage portion 88 which is internally threaded to receive the threaded portion of the adjusting screw. A pair of fingers 90 extend downwardly and outwardly from carriage 88 and have hooks 92 on the outermost ends thereof. Fingers 90 are laterally spaced apart to receive the clamping chain link components therebetween and so as to engage the laterally outwardly extending ends of a link pin 38 in hooks 92 thereof. Rotation of adjusting screw 68 in opposite directions relative to housing 60 operates to move holding component 58 axially inwardly and outwardly along the adjusting screw, and the laterally opposite sides of mounting portion 88 of the holding component engage the inner sides of the housing to preclude rotation of the holding component relative thereto.

In mounting the support on a pipe P, the base with or without tool 12 thereon is positioned on the pipe for the saddle portions of the base to engage therewith as described above, and when the base is first positioned on the pipe in this manner, clamping chain 36 hangs downwardly from mounting column 40. Advantageously in accordance with the present invention, the operator can stabilize the support on pipe P with one hand, reach beneath the pipe to grasp the clamping chain and pull the latter toward the adjusting mechanism, and engage the ends of pin 38 of one of the chain links with hooks 92 of fingers 90 of the holding component. In pulling the chain toward the adjusting mechanism, the terminal end of the chain is displaced downwardly in mounting column 40 against the bias of spring 54 whereby, when the free end of the chain is interengaged with the holding component, the biasing spring engages the chain against pipe P to remove any slack therefrom and thus reduce the effort required on the part of the operator to stabilize the support or the support and working tool as the adjusting screw is rotated through handle 80 to complete the mounting operation. It is not necessary to displace the terminal end of the clamping chain to its fullest extent against the bias of spring 54 during the initial mounting operation to obtain the benefit of the biasing force in removing slack from the mounting chain. In this respect, rotation of the adjusting screw will displace the terminal end of the chain to the extent necessary for collar 52 to engage shoulder 46 to anchor the terminal end against further displacement relative to the mounting column. Thereafter, rotation of the adjusting screw serves to apply the desired clamping force between the base and pipe P. It will be appreciated that adjacent ones of the link pins 38 along the length of the clamping chain at the free end thereof provide a plurality of different locations along the chain from the free end toward the first end for selective interengagement with the holding component, the particular location selected being dependant upon the length of the chain, the diameter of the pipe, and the displacement of the terminal end against the bias of spring 54. When it is desired to remove the support or the support end tool from pipe P, the adjusting screw is rotated in the opposite direction whereupon the tension on the chain is released and spring 54 is allowed to displace the terminal end of the chain upwardly in mounting column 40 from shoulder 46. During such displacement of the adjusting screw, the chain advantageously remains in contact with the pipe to help stabilize the support as the operator turns the adjusting screw and, at the appropriate point, the operator can pull on the free end of the chain to release the latter from the holding component, drop the chain and then lift the support or support and tool from the pipe.

It will be appreciated from the foregoing description that both the mounting and dismounting of the support with or without tool 12 thereon is advantageously achieved from one side of the support and without the operator having to reach under to interconnect or disconnect the free end of the chain with a holding component on the opposite side of the support from where the operator is standing. It will likewise be appreciated that while it is preferred to provide a biasing arrangement in connection with the mounting of the first end of the chain, the latter advantage with respect to attaching the free end of the chain to the adjusting mechanism on the side where the operator is standing can be achieved without a spring biasing arrangement and, moreover, that the latter arrangement can be incorporated in a clamping chain arrangement in which the mounted end of the chain is associated with the adjusting mechanism.

Figure 5:
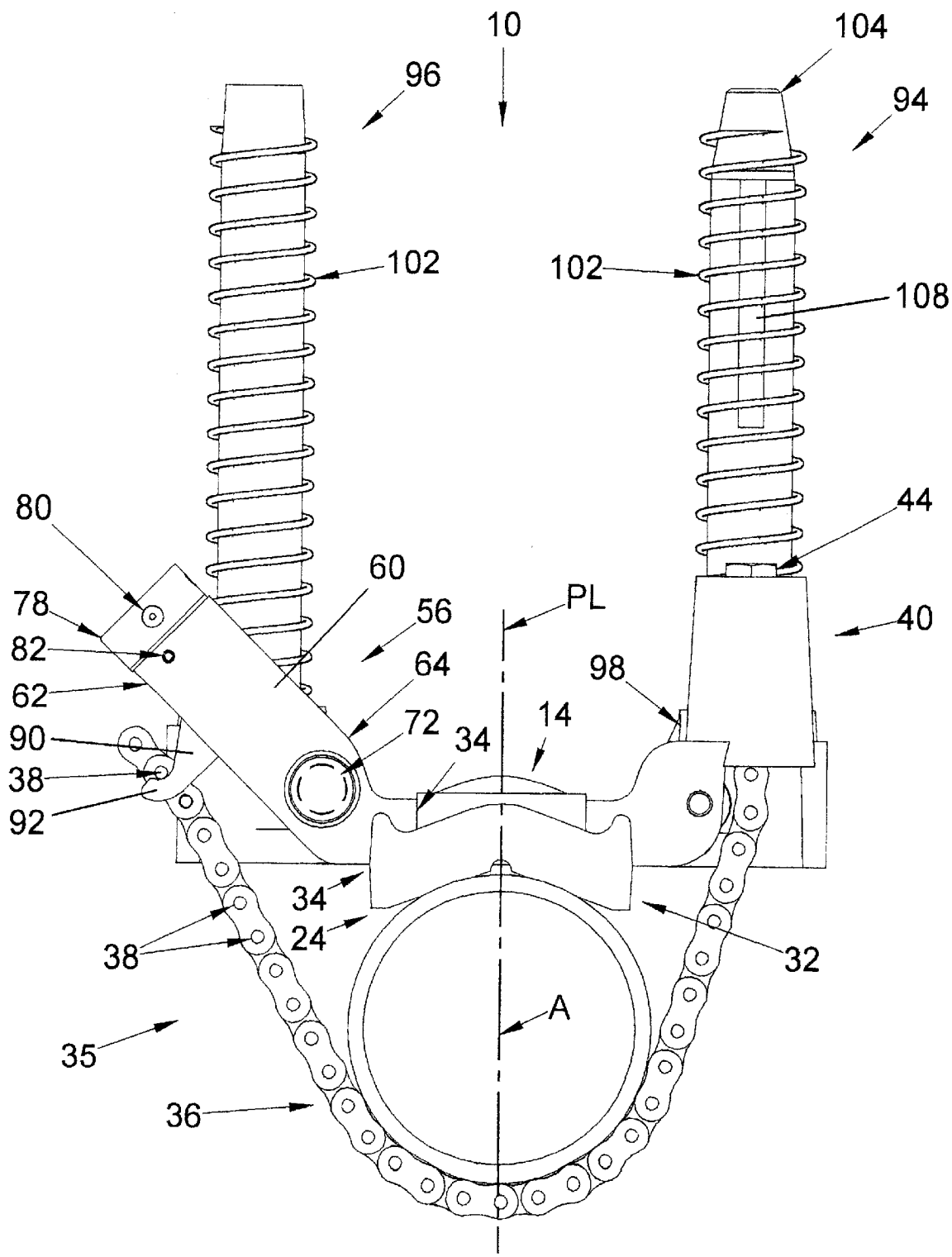
FIG. 5 is a rear elevation view of the tool support mounted on a pipe with the tool removed from the support; and, FIG. 6 is a plan view of the support shown in FIG. 5.

In the embodiment disclosed, base 14 of the support is provided with a pair of posts 94 and 96 for mounting tool 12 on the support, and posts 94 and 96 extend vertically upwardly from base 14 adjacent front end 16 thereof and respectively outwardly adjacent the first and second sides thereof. More particularly, each of the laterally opposite sides of the base is provided with an upwardly extending post mounting sleeve 98 which, as will be appreciated from FIG. 3, receives the lower end of the corresponding one of the posts 94 and 96 which is secured thereto by a pin 100 which extends through openings provided therefor in the mounting sleeve and post. For the purposes set forth hereinafter, each of the mounting posts 94 and 96 receives a compression spring 102, the upper end of post 94 is provided with an end cap 104 in the form of a truncated cone attached to the post by a bolt 106, the rear side of post 94 is provided with an elongate linear slot 108, and the front side of post 96 has teeth 110 which provide a rack extending along the post from the upper end thereof. The lower ends of springs 102 engage the upper end of the corresponding mounting sleeve 98, and the springs have a relaxed condition as shown in FIG. 5 in which the upper ends of the springs are adjacent the upper end of the corresponding one of the mounting posts. Each of the springs is precluded from unintentional axial displacement from the corresponding mounting post by a spring retaining pin 112 which is mounted on and extends radially outwardly from the mounting post between coils of the spring adjacent the lower end thereof.

Tool 12 comprises a support member 114 extending laterally between mounting posts 94 and 96 and having laterally opposite end portions 116 and 118 respectively provided with apertures 120 and 122 therethrough for slidably receiving mounting posts 94 and 96. The front side of side portion 118 of support member 114 is provided with an opening 124 into aperture 122 and with a pair of ears 126 extending forwardly of side portion 118 on laterally opposite sides of opening 124. Ears 126 rotatably support a shaft 128 on which a pinion 130 is mounted for rotation therewith, and rotation is adapted to be imparted to shaft 128 by means of an operating handle 132 mounted on the outer end of the shaft. Pinion 130 extends through opening 124 and into meshing engagement with teeth 110 on mounting post 96 when tool 12 is mounted on support 10, and rotation of operating handle 132 and thus pinion 130 operates to displace support member 114 upwardly and downwardly relative to the mounting post. As best seen in FIG. 3, a release pin assembly 134 is provided on side portion 116 of support member 114 and includes a pin component 136 slidably supported in a mounting sleeve 138 secured to and extending rearwardly from side portion 116. Pin 136 includes an inner end, not designated numerically, received in recess 108 in mounting post 94 and an outer end provided with a head 140 by which the pin can be pulled outwardly relative to sleeve 138 to remove the inner end of the pin from recess 108. A biasing spring 142 is interposed between sleeve 138 and pin 136 to bias the pin inwardly of sleeve 138 to the position shown in FIG. 3. When tool 12 is mounted on support 10 as shown in FIGS. 1–3 of the drawing, springs 102 are compressed between the lower sides of end portions 116 and 118 and the upper ends of post mounting sleeves 98 and bias support member 114 and thus tool 12 upwardly to an uppermost position determined by engagement of the inner end of pin 136 with the upper end of recess 108 which is defined by the underside of end cap 104. When support member 114 is displaced downwardly relative to the mounting post by rotation of operating handle 132, the inner end of pin 136 moves downwardly along recess 108.

In the embodiment illustrated, tool 12 includes an electric motor 144 on the rear side of support member 114 and connected to a suitable source of electric power through a wiring box 146 on the support member and a power cord 148 extending from the box for connection to the power source. Tool 12 further includes a drill chuck assembly 150 mounted on the front side of support member 114 and which is adapted to be driven by motor 144 through a suitable gear train therebetween. Tool 12 further includes a handle 152 mounted on the support member and extending upwardly and rearwardly of the chuck assembly to overlie motor 144, and handle 152 facilitates support of the tool during mounting and removal thereof relative to mounting posts 94 and 96, and in connection with carrying the tool and support 10 as a unit. With regard to the latter, it will be appreciated from FIG. 3 that the engagement of release pin 136 with the upper end of recess 108 enables the tool and base to be carried together as a unit. If the tool is separated from support 10 by pulling pin 36 outwardly and then lifting the tool upwardly of the mounting posts, springs 102 facilitate the separation and are retained on the posts by pins 112. In connection with mounting tool 12 on posts 94 and 96, the truncated conical configuration of end cap 104 provides a camming surface which engages the inner end of pin 136 to displace the latter outwardly against the bias of spring 142 until the pin passes the inner end of the end cap and is biased into recess 108 by spring 142. In connection with both the mounting and removal of tool 12 relative to posts 94 and 96, the upper end of the latter post includes a face 96a which inclines rearwardly relative to teeth 110 on the post which enables the teeth and pinion 130 to disengage during removal of the tool and to reengage upon the movement of post 96 into aperture 122.

While considerable emphasis has been placed herein on the structures and structural interrelationships between the component parts of the preferred embodiment, it will be appreciated that many changes can be made in the preferred embodiment and other embodiments of the invention can be made without departing from the principles thereof. In this respect, for example, it will be appreciated that the clamping chain can be of a structure other than one providing pins extending in laterally opposite directions from the link components for engagement with the holding component of the adjusting mechanism. In this respect, for example, the chain could be of a structure comprising spaced apart rollers between link components and providing a space for the holding component which could be a single finger engaging between the link components as opposed to a pair of fingers engaging laterally outwardly of the link components. These and other modifications as well as other embodiments of the invention will be suggested or obvious to those skilled in the art from the description herein, whereby it is to be distinctly understood that the foregoing descriptive matter is to be interpreted merely as illustrative of the invention and not as a limitation.

Having thus described the invention, it is so claimed:

1. A tool support for mounting a working tool on a pipe having an axis, said support including a base having a saddle portion for straddling a circumferential portion of a pipe to be worked on and first and second laterally opposite sides, and clamping means between said first and second sides for clamping said base to a pipe, said clamping means including a flexible clamping member and a clamping member adjusting mechanism, said clamping member having a first end mounted at said first side of said support and having a free end spaced from said first end, said clamping member adjusting mechanism being on said second side of said support and including holding means for interengaging with said clamping member at a selected one of a plurality of different locations therealong from said free end toward said first end thereof, and said adjusting mechanism including means for displacing said holding means relative to said second side of said support, means mounting said first end of said clamping member on said first side of said support for limited displacement relative thereto in the direction toward said free end of said clamping member, and means biasing said first end against displacement in said direction.

2. A tool support according to claim 1, wherein said flexible clamping member is a link chain having pins pivotally interconnecting adjacent links, said locations along said clamping member being between adjacent pins.

3. A tool support according to claim 2, wherein said link chain includes link members having axially opposite sides with respect to said pins and said pins extend axially outwardly of said opposite sides of said link members.

4. A tool support according to claim 1, wherein said means biasing said first end includes spring means.

5. A tool support for mounting a working tool on a pipe having an axis, said support including a base having a saddle portion for straddling a circumferential portion of a pipe to be worked on and first and second laterally opposite sides, and clamping means between said first and second sides for clamping said base to a pipe, said clamping means including a flexible clamping member and a clamping member adjusting mechanism, said clamping member having a first end mounted at said first side of said support and having a free end spaced from said first end, said clamping member adjusting mechanism being on said second side of said support and including holding means for interengaging with said clamping member at a selected one of a plurality of different locations therealong from said free end toward said first end thereof, and said adjusting mechanism including means for displacing said holding means relative to said second side of said support, said saddle portion is V-shaped and said first and second sides of said support are on laterally opposite sides of a plane bisecting the vertex of the V, said first side of said support including a passage therein having an axis generally parallel to said plane and receiving said first end of said clamping member, and means in said passage interengaging with said first end to support said first end for limited displacement axially of said passage.

6. A tool support according to claim 5, wherein said flexible clamping member is a link chain having pins pivotally interconnecting adjacent links, said locations along said clamping member being between adjacent pins.

7. A tool support for mounting a working tool on a pipe having an axis, said support including a base having a saddle portion for straddling a circumferential portion of a pipe to be worked on and first and second laterally opposite sides, and clamping means between said first and second sides for clamping said base to a pipe, said clamping means including a flexible clamping member and a clamping member adjusting mechanism, said clamping member having a first end mounted at said first side of said support and having a free end spaced from said first end, said clamping member adjusting mechanism being on said second side of said support and including holding means for interengaging with said clamping member at a selected one of a plurality of different locations therealong from said free end toward said first end thereof, and said adjusting mechanism including means for displacing said holding means relative to said second side of said support wherein said saddle portion is V-shaped and said first and second sides of said support are on laterally opposite sides of a plane bisecting the vertex of the V, said first side of said support including a passage therein having an axis generally parallel to said plane and receiving said first end of said clamping member, and means in said passage interengaging with said first end to support said first end for limited displacement axially of said passage, said first end of said clamping member has a terminal end in said passage and said passage has an outlet end through which said clamping member extends in the direction from said terminal end toward said free end thereof, said means interengaging with said first end including a compression spring between said terminal end and said outlet end.

8. A tool support according to claim 7 wherein said means interengaging with said first end further includes a plate member axially displaceable in said passage, said spring being between said plate member and said outlet end.

9. A tool support according to claim 8, wherein said plate member is a collar surrounding said terminal end and said terminal end includes a pin transverse to the axis of said passage and engaging said collar on the side thereof opposite said spring.

10. A tool support according to claim 9, wherein said spring has a relaxed condition in which said collar is in a first position spaced a first distance from said outlet end of said passage and a compressed condition in which said collar is in a second position spaced a second distance from said outlet end, said second distance being less than said first distance, and means in said passage interengaging with said collar in said second position thereof.

11. A tool support according to claim 10, wherein said passage has an entrance end, and a removable closure member for closing said entrance end.

12. A tool support for mounting a working tool on a pipe having an axis, said support including a base having a saddle portion for straddling a circumferential portion of a pipe to be worked on and first and second laterally opposite sides, and clamping means between said first and second sides for clamping said base to a pipe, said clamping means including a flexible clamping member and a clamping member adjusting mechanism, said clamping member having a first end mounted at said first side of said support and having a free end spaced from said first end, said clamping member adjusting mechanism being on said second side of said support and including holding means for interengaging with said clamping member at a selected one of a plurality of different locations therealong from said free end toward said first end thereof, and said adjusting mechanism including means for displacing said holding means relative to said second side of said support wherein said saddle portion is V-shaped and said first and second sides of said support are on laterally opposite sides of a plane bisecting the vertex of the V, said first side of said support including a passage therein having an axis generally parallel to said plane and receiving said first end of said clamping member, and means in said passage interengaging with said first end to support said first end for limited displacement axially of said passage, said flexible clamping member is a link chain having pins pivotally interconnecting adjacent links, said locations along said clamping member being between adjacent pins, said first end of said clamping member has a terminal end in said passage and said passage has an outlet end through which said clamping member extends in the direction from said terminal end toward said free end thereof, said means interengaging with said first end including a compression spring between said terminal end and said outlet end.

13. A tool support according to claim 12, wherein said link chain includes link members having axially opposite sides with respect to said pins and said pins extend axially outwardly of said opposite sides of said link members.

14. A tool support according to claim 13, wherein said base has a radially outer side when mounted on a pipe, and a pair of mounting posts on said base for mounting a tool on said support, said posts extending outwardly from said radially outer side.

15. A tool support according to claim 13, wherein said means interengaging with said first end of said clamping member further includes a collar surrounding said terminal end, said terminal end including a pin transverse to the axis of the passage and engaging said collar on the side thereof opposite said spring, said spring having a relaxed condition and a compressed condition in which said collar is respectively in a first position and a second position with respect to said outlet end of the passage, said second position being closer to said outlet end than said first position, and a shoulder in said passage to stop said collar in said second position.

16. A tool support for mounting a working tool on a pipe having an axis, said support including a base having a saddle portion for straddling a circumferential portion of a pipe to be worked on and first and second laterally opposite sides, and clamping means between said first and second sides for clamping said base to a pipe, said clamping means including a flexible clamping member and a clamping member adjusting mechanism, said clamping member having a first end mounted at said first side of said support and having a free end spaced from said first end, said clamping member adjusting mechanism being on said second side of said support and including holding means for interengaging with said clamping member at a selected one of a plurality of different locations therealong from said free end toward said first end thereof, and said adjusting mechanism including means for displacing said holding means relative to said second side of said support, said saddle portion is V-shaped and said first and second sides of said support are on laterally opposite sides of a plane bisecting the vertex of the V, said adjusting mechanism inclining downwardly and inwardly at an angle to said plane and having laterally outer and inner ends, and said adjusting mechanism including means supporting said holding means for displacement in opposite directions between said outer and inner ends, said means supporting said holding means includes a threaded shaft supported for rotation in opposite directions about a shaft axis between said outer and inner ends, a carriage member displaceable in opposite directions between said ends in response to rotation of said shaft, and means on said carriage member for interengaging with said clamping member, said first side of said support includes a passage having an axis generally parallel to said plane and receiving said first end of said clamping member, and means including a compression spring in said passage interengaging with said first end to support said first end for limited displacement axially of said passage.

17. A tool support according to claim 16, wherein said first end of said clamping member has a terminal end in said passage and said passage has an outlet end in the direction from said terminal end toward said free end of said clamping member, said spring being between said terminal end and said outlet end.

18. A tool support according to claim 17, wherein said means interengaging with said first end of said clamping member further includes a collar surrounding said terminal end, said terminal end including a pin transverse to the axis of the passage and engaging said collar on the side thereof opposite said spring, said spring having a relaxed condition and a compressed condition in which said collar is respectively in a first position and a second position with respect to said outlet end of the passage, said second position being closer to said outlet end than said first position, and a shoulder in said passage to stop said collar in said second position.

19. A tool support according to claim 18, wherein said flexible clamping member is a link chain having pins pivotally interconnecting adjacent links, said locations along said clamping member being between adjacent pins, and said means on said carrier including at least one finger for engaging a pin on said link chain.

20. A tool support according to claim 19, wherein said link chain includes link members having axially opposite sides with respect to said pins and said pins extend axially outwardly of said opposite sides of said link members.

21. A tool support according to claim 20, and an operating member for rotating said shaft.

22. A tool support for mounting a working tool on a pipe having an axis, said support including a base having a saddle portion for straddling a circumferential portion of a pipe to be worked on and first and second laterally opposite sides, and clamping means between said first and second sides for clamping said base to a pipe, said clamping means including a flexible clamping member and a clamping member adjusting mechanism, said clamping member having a first end mounted at said first side of said support and having a free end spaced from said first end, said clamping member adjusting mechanism being on said second side of said support and including holding means for interengaging with said clamping member at a selected one of a plurality of different locations therealong from said free end toward said first end thereof, and said adjusting mechanism including means for displacing said holding means relative to said second side of said support, said base has a radially outer side when mounted on a pipe, and a pair of mounting posts on said base for mounting a tool on said support, said posts extending outwardly from said radially outer side.

23. A tool support for mounting a working tool on a pipe having an axis, said support including a base having a saddle portion for straddling a circumferential portion of a pipe to be worked on and first and second laterally opposite sides, and clamping means between said first and second sides for clamping said base to a pipe, said clamping means including a flexible clamping member having a mounted end at one of said sides and a free end spaced from said mounted end, and means including spring means supporting said mounted end of said clamping member on said one side for limited displacement in the direction toward said free end, and said limited displacement being against the bias of said spring means.

24. A tool support according to claim 23, wherein said clamping means further includes holding means for interengaging with said clamping member at a selected one of a plurality of different locations therealong from said free end toward said mounted end thereof, and a clamping member adjusting mechanism for tensioning said clamping member.

25. A tool support according to claim 24, wherein said flexible clamping member is a link chain having pins pivotally interconnecting adjacent links, said locations along said clamping member being between adjacent pins.

26. A tool support according to claim 25, wherein said link chain includes link members having axially opposite sides with respect to said pins and said pins extend axially outwardly of said opposite sides of said link members.

27. A tool support according to claim 23, wherein said one of said sides of said base includes a passage therein receiving said mounted end of said clamping member, said passage having an outlet end through which said clamping member extends in the direction toward said free end, spring engaging means on said mounted end, and said spring means including a compression spring between said spring engaging means and said outlet end of the passage.

28. A tool support according to claim 27, wherein said spring engaging means includes a collar surrounding said mounted end and engaging said spring and a pin on said mounted end engaging said collar on the side thereof opposite said spring.

29. A tool support according to claim 28, wherein said spring has a relaxed condition in which said collar is in a first position spaced a first distance from said outlet end of said passage and a compressed condition in which said collar is in a second position spaced a second distance from said outlet end, said second distance being less than said first distance, and means in said passage interengaging with said collar in said second position thereof.

30. A tool support according to claim 29, wherein said passage has an entrance end, and a removable closure member for closing said entrance end.

31. A tool support according to claim 30, wherein said flexible clamping member is a link chain having pins pivotally interconnecting adjacent links, said locations along said clamping member being between adjacent pins.

32. A tool support according to claim 31, wherein said link chain includes link members having axially opposite sides with respect to said pins and said pins extend axially outwardly of said opposite sides of said link members.

33. A tool support according to claim 23, wherein said base has a radially outer side when mounted on a pipe, and a pair of mounting posts on said base for mounting a tool on said support, said posts extending outwardly from said radially outer side.

34. A cutting tool for cutting a hole in a pipe having an axis, comprising a base including a saddle portion for straddling a circumferential portion of a pipe in which a hole is to be cut, a power driven hole cutter mounted on said base, said base having first and second sides on laterally opposite sides of said saddle portion, and a clamping arrangement for clamping said base and hole cutter on pipes having different diameters, said clamping arrangement including a link chain having a first end anchored to said first side of said base and having a free end spaced from said first end, and a chain adjusting mechanism on said second side of said base and including a holding member for interengaging with a selected one of the links of said chain at a location therealong from said free end toward said first end, and means mounting said holding member on said second side of said base for displacement relative thereto toward and away from said first end of the chain, said first end of said chain is mounted on said first side for displacement relative thereto between first and second positions in which said first end is respectively retracted and extended relative to said first side, and means biasing said first end toward said first position.

35. A cutting tool according to claim 34, and means stopping said first end in said second position.

36. A cutting tool for cutting a hole in a pipe having an axis, comprising a base including a saddle portion for straddling a circumferential portion of a pipe in which a hole is to be cut, a power driven hole cutter mounted on said base, said base having first and second sides on laterally opposite sides of said saddle portion, and a clamping arrangement for clamping said base and hole cutter on pipes having different diameters, said clamping arrangement including a link chain having a first end anchored to said first side of said base and having a free end spaced from said first end, and a chain adjusting mechanism on said second side of said base and including a holding member for interengaging with a selected one of the links of said chain at a location therealong from said free end toward said first end, and means mounting said holding member on said second side of said base for displacement relative thereto toward and away from said first end of the chain, said saddle portion is V-shaped and the axis of a pipe on which the base is mounted lies in a plane bisecting the V, said first side of said base including a passage receiving said first end of said chain and having an axis generally parallel to said plane, and said holding member being displaceable relative to said second end along a path inclined downwardly and inwardly relative to said plane.

37. A cutting tool for cutting a hole in a pipe having an axis, comprising a base including a saddle portion for straddling a circumferential portion of a pipe in which a hole is to be cut, a power driven hole cutter mounted on said base, said base having first and second sides on laterally opposite sides of said saddle portion, and a clamping arrangement for clamping said base and hole cutter on pipes having different diameters, said clamping arrangement including a link chain having a first end anchored to said first side of said base and having a free end spaced from said first end, and a chain adjusting mechanism on said second side of said base and including a holding member for interengaging with a selected one of the links of said chain at a location therealong from said free end toward said first end, and means mounting said holding member on said second side of said base for displacement relative thereto toward and away from said first end of the chain, said first side of said base includes a passage receiving said first end of said chain and having an outlet end through which said chain extends toward the free end thereof, said first end having a terminal end in said passage spaced from said outlet end, and a compression spring in said passage between said terminal end and said outlet end and biasing said terminal end away from said outlet end.

38. A cutting tool according to claim 37, and means in said passage for limiting displacement of said terminal end in the direction toward said outlet end of said passage.

39. A cutting tool according to claim 38, wherein said terminal end includes a pin transverse to said passage and a collar between said pin and spring, said means in said passage for limiting displacement of said terminal end including a shoulder engaged by said collar.

40. A cutting tool according to claim 39, wherein said chain adjusting mechanism includes a threaded shaft mounted on said second side of said base for rotation in opposite directions about a shaft axis, and a carrier threadedly interengaged with said shaft for displacement thereofalong in response to rotation of said shaft, said holding member including at least one finger for interengaging with a link of said chain.

41. A cutting tool according to claim 40, wherein said link chain includes link members having axially opposite sides with respect to said pins and said pins extend axially outwardly of said opposite sides of said link members.

42. A cutting tool according to claim 40, wherein said saddle portion is V-shaped and the axis of a pipe on which the support is mounted lies in a plane bisecting the V, said passage in said second side being generally parallel to said plane, and said shaft axis being inclined downwardly and inwardly relative to said plane.

43. A cutting tool according to claim 42, and means in said passage for limiting displacement of said terminal end in the direction toward said outlet end of said passage.

44. A cutting tool according to claim 43, wherein said terminal end includes a pin transverse to said passage and a collar between said pin and spring, and said means in said passage for limiting displacement of said terminus including a shoulder engaged by said collar.

45. A cutting tool according to claim 44, wherein said link chain includes link members having axially opposite sides with respect to said pins and said pins extend axially outwardly of said opposite sides of said link members.

46. A cutting tool according to claim 45, and an operating member for rotating said shaft.

47. A cutting tool for cutting a hole in a pipe having an axis, comprising a base including a saddle portion for straddling a circumferential portion of a pipe in which a hole is to be cut, a power driven hole cutter mounted on said base, said base having first and second sides on laterally opposite sides of said saddle portion, and a clamping arrangement for clamping said base and hole cutter on pipes having different diameters, said clamping arrangement including a link chain having a first end anchored to said first side of said base and having a free end spaced from said first end, and a chain adjusting mechanism on said second side of said base and including a holding member for interengaging with a selected one of the links of said chain at a location therealong from said free end toward said first end, and means mounting said holding member on said second side of said base for displacement relative thereto toward and away from said first end of the chain, said base includes first and second mounting posts respectively adjacent said first and second sides and said hole cutter includes a support member having first and second apertures therethrough respectively slidably receiving said first and second mounting posts, said support member and one of said mounting posts include means for releasably mounting said support member on said mounting posts.

48. A cutting tool according to claim 47, wherein said means for releasably mounting said support member includes a recess in said one mounting post and a release pin on said support member.

49. A cutting tool according to claim 48, wherein said release pin is supported on said support member for displacement radially inwardly and outwardly between extended and retracted positions relative to the one of said first and second apertures corresponding to said one mounting post, and said release pin in said extended and retracted positions having an inner end respectively engaging in said recess to retain said support member on said first and second mounting posts and disengaging said recess to release said support member for removal from said mounting posts.

50. A cutting tool according to claim 49, and a biasing spring biasing said release pin toward said extended position.

51. A cutting tool according to claim 50, wherein said support member and the other of said first and second mounting posts include means for reciprocating said support member relative to said mounting posts.

52. A cutting tool according to claim 51, wherein said means for reciprocating said support member includes teeth on said other mounting post, a pinion rotatably mounted on said support member and having teeth in meshing engagement with said teeth on said other past, and an operating member for manually rotating said pinion.

53. A cutting tool according to claim 47, wherein said support member has an upper side and opposite ends and includes a handle on said upper side extending in the direction between said opposite ends.

54. A cutting tool according to claim 53, wherein said means for releasably mounting said support member includes a recess in said one mounting post and a release pin on said support member, said release pin being supported on said support member for displacement radially inwardly and outwardly between extended and retracted positions relative to the one of said first and second apertures corresponding to said one mounting post, said release pin in said extended and retracted positions having an inner end respectively engaging in said recess to retain said support member on said first and second mounting posts and disengaging said recess to release said support member for removal from said mounting posts, and a biasing spring biasing said release pin toward said extended position.

55. A cutting tool according to claim 54, further including means for reciprocating said support member comprising teeth on said other mounting post, a pinion rotatably mounted on said support member and having teeth in meshing engagement with said teeth on said other post, and an operating member for manually rotating said pinion.

56. In a cutting tool for cutting a hole in a pipe having an axis, comprising a base including a saddle portion for straddling a circumferential portion of a pipe in which a hole is to be cut, a clamping arrangement for clamping said base on pipes having different diameters, first and second mounting posts on said base, and a power driven hole cutter including a support member having first and second apertures therethrough respectively slidably receiving said first and second mounting posts, the improvement comprising: said support member and one of said mounting posts including means for releasably mounting said support member on said mounting posts.

57. The improvement according to claim 56, wherein said means for releasably mounting said support member includes a recess in said one mounting post and a release pin on said support member.

58. The improvement according to claim 57, wherein said release pin is supported on said support member for displacement radially inwardly and outwardly between extended and retracted positions relative to the one of said first and second apertures corresponding to said one mounting post, and said release pin in said extended and retracted positions having an inner end respectively engaging in said recess to retain said support member on said first and second mounting posts and disengaging said recess to release said support member for removal from said mounting posts and a biasing spring biasing said release pin toward said extended position.

59. The improvement according to claim 58, further including means for reciprocating said support member comprising teeth on said other mounting post, a pinion rotatably mounted on said support member and having teeth in meshing engagement with said teeth on said other post, and an operating member for manually rotating said pinion.

60. The improvement according to claim 56, wherein said support member has an upper side and opposite ends and includes a handle on said upper side extending in the direction between said opposite ends.

61. The improvement according to claim 60, wherein said means for releasably mounting said support member includes a recess in said one mounting post and a release pin on said support member, said release pin being supported on said support member for displacement radially inwardly and outwardly between extended and retracted positions relative to the one of said first and second apertures corresponding to said one mounting post, said release pin in said extended and retracted positions having an inner end respectively engaging in said recess to retain said support member on said first and second mounting posts and disengaging said recess to release said support member for removal from said mounting posts, and a biasing spring biasing said release pin toward said extended position.

62. The improvement according to claim 61, further including means for reciprocating said support member comprising teeth on said other mounting post, a pinion rotatably mounted on said support member and having teeth in meshing engagement with said teeth on said other post, and an operating member for manually rotating said pinion.

* * * * *